March 26, 1963 M. KESSMAN 3,082,866
DISPOSABLE FILM SPLICING PACKAGE
Filed July 16, 1959 2 Sheets-Sheet 1
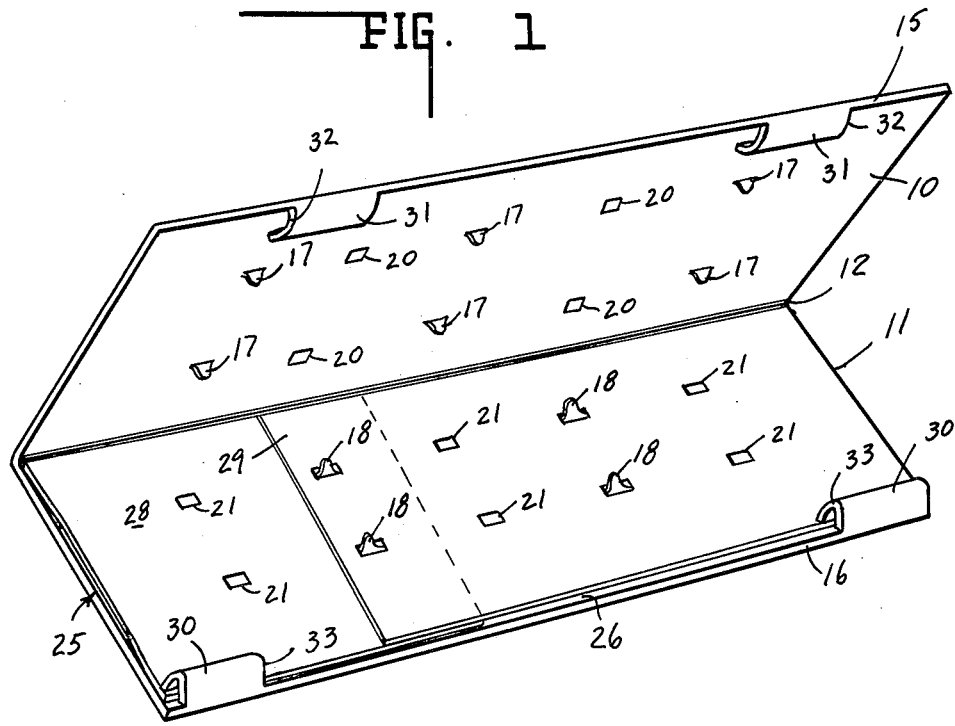
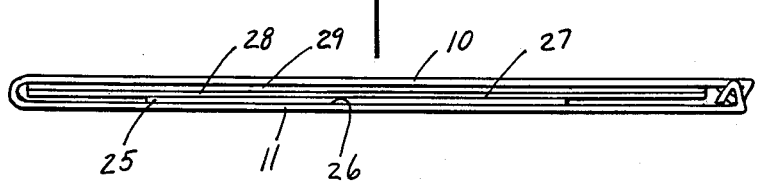
INVENTOR.
MAURICE KESSMAN,
BY
Lockwood, Woodard, Smith & Weikart.
ATTORNEYS.

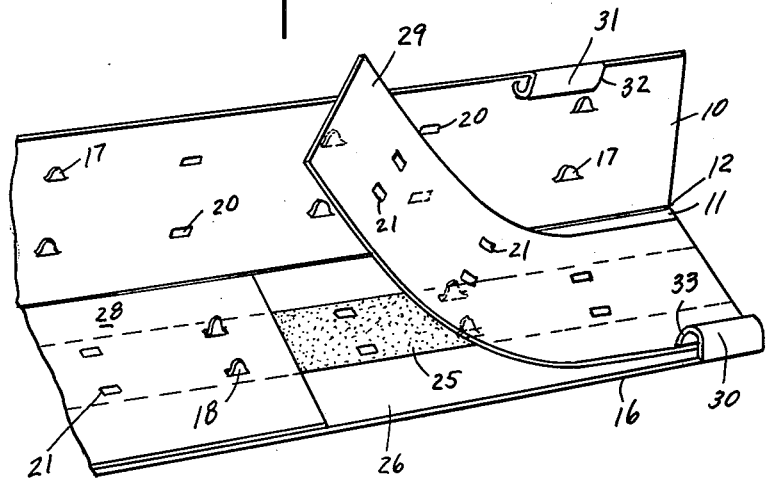

United States Patent Office 3,082,866
Patented Mar. 26, 1963

3,082,866
DISPOSABLE FILM SPLICING PACKAGE
Maurice Kessman, Bloomington, Ind.
(182 Dorking Road, Rochester 10, N.Y.)
Filed July 16, 1959, Ser. No. 827,630
2 Claims. (Cl. 206—46)

The present invention relates to a device and method for splicing, patching, repairing or marking ribbon-like materials.

In many industries and fields such as the motion picture, radio, and television broadcasting, sound recording, automation and computing, telegraphy, library and documentation, it is customary to make use of long lengths of ribbon-like materials such as motion picture film, mangetic recording tape, perforated paper tape, and microfilm. It is common practice to splice, patch, repair and mark such strips of ribbon-like material by using complicated, cumbersome and relatively expensive devices, which often require special knowledge and skills for their operation.

It is, therefore, an object of the present invention to provide a simple, easily used, relatively economical and expendable device for use in the field or in an emergency, the device being capable of quick and easy splicing, patching, repairing or marking of ribbon-like material.

Another object of the present invention is to provide a device for splicing ribbon-like material having perforations or other apertures at regular intervals there along, the device being capable of accurately positioning the two portions of ribbon-like material to be spliced whereby the perforations of one portion are accurately spaced from the perforations of the other portion.

A related object of the present invention is to provide a device for splicing two portions of motion picture film having perforations at regular intervals, the device being capable of accurately spacing the perforations of one portion from the perforations of the other portion of the film.

Still a further object of the present invention is to provide a device for splicing, a patching, repairing or marking ribbon-like materials, which device is completely self-contained and self-sufficient for its intended purposes.

A still further object of the present invention is to provide a device for splicing, patching, repairing or marking ribbon-like material, which device does not require the use of liquid, inks or the scraping of any surfaces, the operation of the device being dry and dust-free.

Another object of the present invention is to provide a device for splicing, patching, repairing or marking magnectic ribbon-like materials, such as, for example, magnetic recording tapes.

Still a further object of the present invention is to provide a device for splicing, patching, repairing or marking ribbon-like materials, which device is relatively small and easily carried.

Still further objects will become apparent as the description proceeds.

The full nature of the invention will be understood from the accompanying drawings and the following description and claims:

FIG. 1 is a perspective view of a device for splicing, patching, repairing or marking ribbon-like material, which device embodies the present invention.

FIG. 2 is an end elevation view of the device of FIG. 1 showing the device in a different position than illustrated in FIG. 1, within which position it might be sold by a suitable retail outlet and easily carried in the pocket or in a kit prior to use.

FIG. 3 is a perspective view of a portion of the device showing the protective cover partially removed from its masking and protecting position on the pre-cut pressure sensitive adhesive tape.

Referring now to the drawings, my device comprises a pair of equal sized plates or "tables" 10 and 11 which are hingedly connected together by means of a fold 12. In place of the fold suitable small hinges may be provided. The plates may be formed of a single piece of plastic or other non-metallic material which has a rectangular shape and is folded centrally and parallel to two opposite edges 15 and 16 of the piece of material to provide the rectangular, elongated plates 10 and 11.

Each of these plates has extending therefrom a plurality of projections 17 and 18 which are longitudinally spaced from one another at regular intervals corresponding to the spacing of the perforations in the ribbon-like material to be spliced. Each of the plates also has a plurality of indentations or apertures 20 and 21 which receive the projections when the two plates are folded together.

In effect the hinged plates form alignment tables in their open position and cooperate to form a press in their closed position, and it is within the scope of the invention to provide registration and alignment means other than apertures and indentations on the one hand and projections on the other.

A length of pre-cut tape 25 overlies the plate 11 and has one complete face in contact with and substantially covering the surface 26 of the plate. On its opposite face 27 the tape has a coating of pressure sensitive adhesive. Covering this face of the tape are a pair of protective coverings 28—28 which form a seal and retaining means and may be provided with a pair of flaps 29—29 for facilitating their removal from the adhesive covered surface of the tape.

At the edges 15 and 16 of the plates 10 and 11 there are located locking tabs 30—30 and 31—31. These locking tabs are so proportioned and located that when the plates are closed together, i.e. folded, the edges 32 and 33 of the locking tabs 30 and 31 engage one another to lock the plates in closed position. Thus the present device may be easily sold by a retail outlet in the closed position as illustrated in FIG. 2. If desired, small spots of glue or other means may be used to secure the tape 25 to the surface 26 of plate 11 to retain the tape in place prior to use; however, such attachment should not be too secure and in most cases may be dispensed with.

To use the device the following method is employed: the plates 10 and 11 may be separated to the position illustrated in FIG. 1 and one of the protective coverings 28 is then removed from the pressure sensitive adhesive tape 25, the start of which is illustrated in FIG. 3. The film or other material to be spliced is next placed in contact with that portion of tape 25 that is exposed by the removal of one of the protective coverings. Next the other covering is removed whereupon the film or material to be spliced is placed in contact with this exposed portion of the tape. If desired, the film may be overlapped or the splice may be a butt splice. The plates are then folded together and pressure is applied to the outer surface of the plates causing the film and tape to securely adhere together.

From the above description, it will be obvious that the present invention has many other uses than the splicing of perforated film. For example, the device may be manufactured without the projections 17 and 18 and without the apertures 20 and 21 for splicing ribbon-like material having no perforations therein. Also the adhesive tape 25 may carry suitable photographs, pictures, instructions or indicia on its face 27 for marking the ribbon-like material. From the above description, it will be also obvious that the device may be used for patching or other repairing of ribbon-like material.

While the invention has been described in some detail in the drawings and the foregoing description, they are to be considered as illustrative and not restrictive in character as modifications within the broad scope of the invention may readily suggest themselves to persons skilled in this art, reference being to the appended claims.

The invention claimed is:

1. The combination of a disposable device for splicing ribbon-like material and a section of tape having pressure sensitive adhesive on one face thereof, said disposable device comprising a pair of plates connected together and each movable toward the other, a first of said plates having a face movable into contact with and overlying a face of a second of said plates, one of said plate faces receiving said pressure sensitive adhesive tape thereon, locking tabs extending from an edge remote from said plate connection of said first plate, and locking tabs extending from and positioned on an edge remote from said plate connection of said second plate to lockingly engage said tabs of said first plate when the plate faces are moved into contact whereby two ribbon-like members with said adhesive tape positioned to splice said members may be locked between said plates causing the ribbon-like members and the tape to be joined.

2. The combination of a disposable device and a section of pressure sensitive adhesive tape for splicing ribbon-like members having spaced perforations therein wherein said disposable device comprises a pair of plastic material plates integrally connected and foldable toward each other, a first of said plates having a face in contact with and overlying a face of a second of said plates when said plates are folded to a closed position, both of said plates comprising apertures and projections positioned to accommodate perforations in two ribbon-like members and retain the same between the plates, one of said plate faces receiving said pressure sensitive adhesive tape thereon whereby two ribbon-like members may be placed thereover, locking tabs extending from an edge remote from said folding plate connection of said first plate, and locking tabs extending from and positioned on an edge remote from said folding plate connection of said second plate to lockingly engage said tabs of said first plate when said plates are folded to a closed position thereby locking said ribbon-like members in contact with said adhesive splicing tape between said plates and upon pressure being applied to said plates the tape and ribbon-like members being joined.

References Cited in the file of this patent

UNITED STATES PATENTS

| | | |
|---|---|---|
| 1,432,466 | Kalmboch | Oct. 17, 1922 |
| 1,771,394 | Antonuk | July 29, 1930 |
| 2,250,194 | Gavin | July 22, 1941 |
| 2,367,330 | Bolsey | Jan. 16, 1945 |
| 2,506,933 | Mercer | May 9, 1950 |
| 2,547,487 | Penny | Apr. 3, 1951 |
| 2,565,009 | Wallingsford | Aug. 21, 1951 |
| 2,940,884 | White | June 14, 1960 |
| 2,994,362 | Hall | Aug. 1, 1961 |